(12) United States Patent
Nguyen et al.

(10) Patent No.: US 7,880,724 B2
(45) Date of Patent: Feb. 1, 2011

(54) INTEGRATED HANDHELD DATA PROCESSING DEVICE HAVING A SLIDING FORM FACTOR

(75) Inventors: Huy P. Nguyen, San Jose, CA (US); Lawrence Lam, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 22 days.

(21) Appl. No.: 11/611,830

(22) Filed: Dec. 15, 2006

(65) Prior Publication Data

US 2007/0146330 A1 Jun. 28, 2007

Related U.S. Application Data

(63) Continuation of application No. 10/006,537, filed on Nov. 30, 2001, now Pat. No. 7,187,363.

(51) Int. Cl.
G06F 1/16 (2006.01)
H04M 1/00 (2006.01)

(52) U.S. Cl. ............. 345/168; 379/433.12; 379/433.07; 379/447; 455/575.4

(58) Field of Classification Search ................ D14/138; 345/168, 169; 361/680, 681; 379/428.01, 379/428.03, 433.01–433.05, 433.11–433.13, 379/437; 455/575.1, 575.3–575.4, 575.8
See application file for complete search history.

(56) References Cited

U.S. PATENT DOCUMENTS

| 5,109,539 | A | | 4/1992 | Inbushi et al. |
| D326,451 | S | | 5/1992 | Roegner |
| 5,235,561 | A | | 8/1993 | Seager |
| 5,381,387 | A | | 1/1995 | Blonder et al. |
| 5,440,629 | A | * | 8/1995 | Gray ..................... 379/433.12 |
| 5,644,338 | A | * | 7/1997 | Bowen ........................ 345/168 |
| 5,719,936 | A | | 2/1998 | Hillenmayer |
| 6,064,734 | A | | 5/2000 | Hasegawa et al. |
| 6,233,469 | B1 | | 5/2001 | Watanabe |
| 6,262,716 | B1 | | 7/2001 | Raasch |
| 6,317,313 | B1 | | 11/2001 | Mosgrove et al. |
| 6,483,445 | B1 | * | 11/2002 | England ...................... 341/22 |
| 6,535,749 | B1 | | 3/2003 | Iwata et al. |
| 6,549,194 | B1 | | 4/2003 | McIntyre et al. |
| 6,577,877 | B1 | * | 6/2003 | Charlier et al. ............. 455/557 |
| 6,643,124 | B1 | | 11/2003 | Wilk |
| 6,665,173 | B2 | * | 12/2003 | Brandenberg et al. ....... 361/680 |
| 6,748,249 | B1 | * | 6/2004 | Eromaki et al. .......... 455/575.4 |
| 7,069,063 | B2 | * | 6/2006 | Halkosaari et al. ....... 455/575.8 |
| 7,187,363 | B2 | * | 3/2007 | Nguyen et al. .............. 345/168 |

(Continued)

OTHER PUBLICATIONS

U.S. Appl. No. 60/329,180 by P. Capps filed Oct. 15, 2001.*

*Primary Examiner*—Alexander S. Beck
(74) *Attorney, Agent, or Firm*—Mahamedi Paradice Kreisman LLP

(57) ABSTRACT

A handheld data processing device having three functional components assembled in a sliding configuration. A processor module is mechanically coupled to two sliding covers. The processor module houses circuits for performing the functions of data processing and may also include a display and input/output functionality. The two sliding covers provide protection for the processor module and may include input/output transducers such as a keypad, speaker or microphone. Embodiments of the handheld data processing device include a handheld computer, wireless telephone and handheld video display. Used as a telephone, the sliders may house a speaker and a microphone.

14 Claims, 6 Drawing Sheets

U.S. PATENT DOCUMENTS

| | | | |
|---|---|---|---|
| 2001/0011993 A1* | 8/2001 | Saarinen | 345/156 |
| 2003/0034987 A1 | 2/2003 | Webb et al. | |
| 2003/0073414 A1* | 4/2003 | Capps | 455/90 |
| 2003/0112225 A1 | 6/2003 | Granberg | |

* cited by examiner

INTEGRATED HANDHELD DATA PROCESSING DEVICE HAVING A SLIDING FORM FACTOR

RELATED APPLICATIONS

This application is a continuation of U.S. patent application Ser. No. 10/006,537 filed Nov. 30, 2001 now U.S. Pat. No. 7,187,363,entitled INTEGRATED HANDHELD DATA PROCESSING DEVICE HAVING A SLIDING FORM FACTOR, which is hereby incorporated by reference in its entirety.

FIELD OF THE INVENTION

The present claimed invention relates to the field of handheld data processing devices. More particularly, embodiments of the present claimed invention relate to an integrated handheld device having three components with a sliding configuration.

BACKGROUND ART

Over the years, many electronic instruments and devices have been sufficiently reduced in size to become portable, and in turn, small enough to be held and operated in the hand of the user. The advent of integrated circuits greatly increased the number of devices that could achieve portability and handheld status, as well as increasing the functionality of such devices.

Today, handheld data processing devices include computers, video displays, audio players and recorders, laboratory instruments, telephones and other communications devices. In many cases, multiple functions may be integrated into a single device such as in a telephone/audio player combination.

The data processing functions included in a handheld device may require a variety of input/output capabilities. Devices with audio signal processing capabilities require a microphone for input and/or a speaker for output. Tactile transducers such as keypads and touch panel displays are useful for general alphanumeric input to a wide variety of devices. Visual displays ranging from simple indicating lights to video displays capable of rendering a television broadcast may be found as the outputs on many handheld devices.

In addition to user input/output interfaces, devices may also have wireless transmitters and receivers. These wireless interfaces may use radio frequency, infrared, or visible portions of the electromagnetic spectrum.

The competing interests of increasing functionality and small size in handheld devices have led to compromises in the design of the fixed form factor packages that are used for most handheld devices. For example, devices such as calculators or personal digital assistants must allocate a fixed amount of available surface area to a display and a keypad.

Ergonomic constraints also play a key role in the design of fixed form factor handheld devices. The degree of miniaturization that can be applied to a keypad is typically limited by the size and dexterity of an average user's fingers. Likewise, the placement of a speaker and microphone for a telephone is limited by the mouth and ear separation of a typical user.

Fixed form factor handheld devices such have been supplemented by variable form factor devices having components connected by hinges. In general, hinges provide a more compact form factor for storage when closed, but the device is often not functional with the hinge in a closed position (e.g., a some handheld calculators).

Conventional placements of speakers, microphones, and keyboards (keypads) yielded larger PDA form factors and resulted in undesirable telephony experiences while also not addressing issues relating to an integrated display protection solution. Displays were left exposed and unprotected from debris and facial oils during phone usage. Many integrated keyboards are forced to fit within the width of a portrait-mode device, thus compromising ergonomics due to decreased key size and spacing. Further, earpiece to microphone separations were solely dictated by device size, whether too small or too large.

Thus, a need exists for an adjustable form factor for handheld devices that provides functionality in both extended and compact forms.

SUMMARY OF INVENTION

Accordingly, several embodiments of the present invention include structures that provide a handheld data processing device with functionality in a variety of forms. The input and output characteristics for the device are adjustable by the user through variations of the form factor of the handheld device.

A handheld data processing device having three functional components assembled in a sliding configuration is disclosed. A processor module is mechanically coupled to two sliding covers. The processor module houses circuits for performing the functions of data processing and may also include a display and input/output functionality. The two sliding covers provide protection for the processor module (including display screen) and may include input/output transducers such as a keypad, speaker or microphone. Embodiments of the handheld data processing device include a handheld computer, wireless telephone and handheld video display.

In an embodiment of the present invention, housed as a handheld computer, the display and processing functions are integrated within a display/processor module and two keypad sliders provide a keypad for input. The keypad sliders may slide in a plane parallel to the surface of the display and may adjusted to shield or expose the display by sliding. One or both of the keypad sliders may include a transparent window that enables viewing of the display while in the closed position. In one embodiment, a "QWERTY" keypad with control and option keys is provided.

In another embodiment of the present invention, a wireless telephone, the display and processing functions are housed in a transceiver module and the two keypad sliders provide a keypad for input. One of the two keypad sliders houses a microphone and the other houses a speaker. The two sliders are capable of sliding independently of one another and allow for adjustment of the microphone and speaker separation distance. Additionally, one or more detent mechanisms may be provided to provide for setting a repeatable and stable microphone and speaker separation distance. In this embodiment, the speaker and microphone may be located on the side of the device that is opposite of the display.

The invention separates the traditional handheld computer component package into three distinct elements that reconfigure relative to each other through a sliding mechanism. The articulating left/right side element may house numerical dialer keys for telephony functionality, full QWERTY keyboard, and navigation/application keys on the front of the device and speaker and microphone on the rear of the device. The center, fixed element may house the display/PCB/battery, etc.

The left/right housing may slide over a majority of the display module in the closed position. Advantages to this articulation are:

decreased overall length of the product for compact storage, one handed telephony usage, and/or keyboard input.

protection of the display from debris and sharp objects during storage.

protection of the display from facial oils and chemicals during telephony modes when device is placed against face and ear.

provides a more ergonomically oriented keyboard design for data input/retrieval and telephone dialing that is accessible whether device is open or closed.

partially exposed display is convenient for minimal PDA and/or telephony information display.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

In the following detailed description of the present invention, an integrated handheld data processing device having a sliding form factor, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Figure 1:
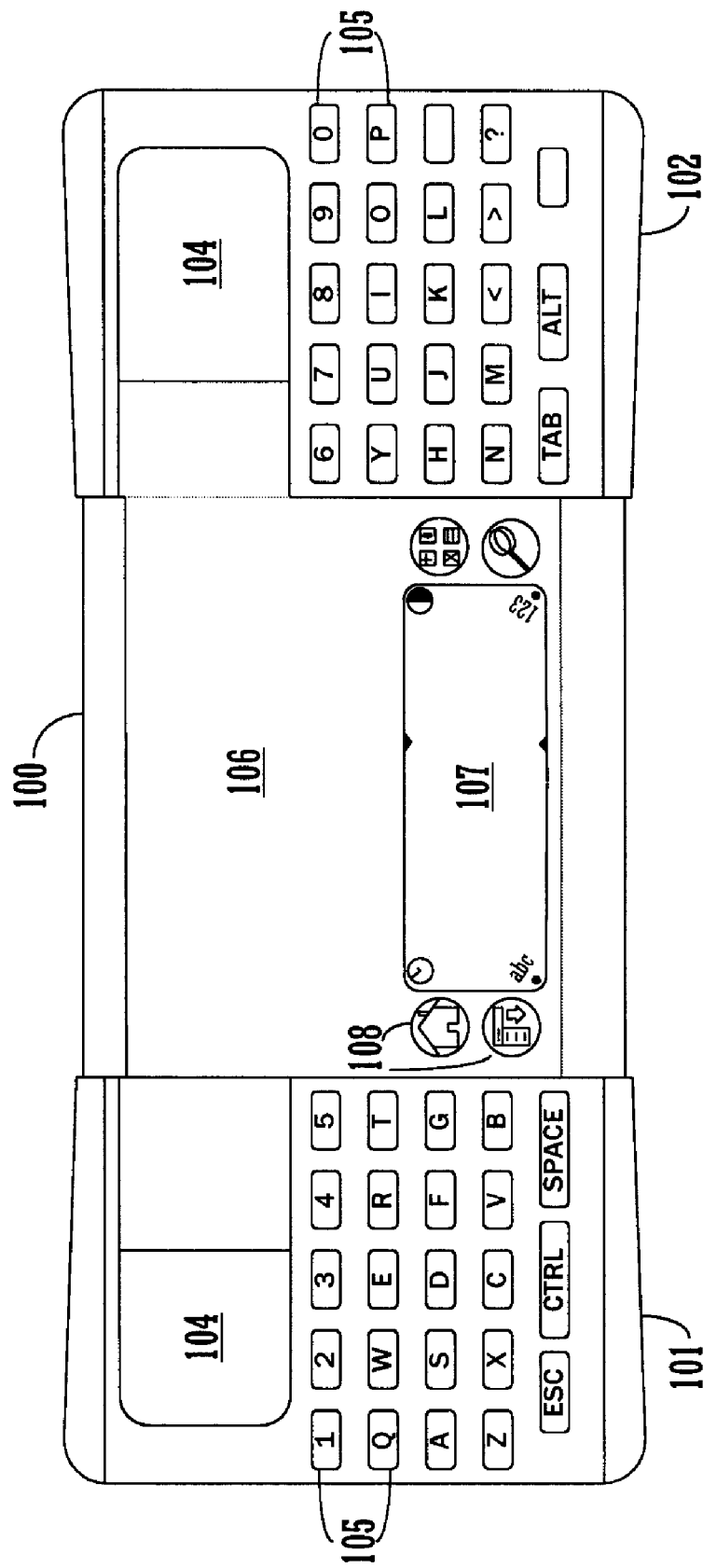
FIG. 1 shows a handheld data processing device with a sliding form factor in an open position in accordance with an embodiment of the present claimed invention.

FIG. 1 shows a handheld data processing device with a sliding form factor in an open position in accordance with an embodiment of the present invention. The handheld device has three basic components: a processor/display module 100, a first slider 101 and a second slider 102.

Each of the three basic components may house a unique set of functions. General examples of the functions that may be housed in a processor display module or a slider will be provided below.

Further examples of functionality and construction may be found in U.S. patent application Ser. No. 09/932,213, "Handheld Computer Having Moveable Segments That Can Be Adjusted to Affect a Size of the Handheld Computer", filed Aug. 17, 2001; which is incorporated herein by reference.

It should be noted that a slider or display/processor module 100 incorporated in a handheld data processing device in accordance with the present invention may have more or less functionality than the following examples. For example, a slider of a particular handheld device may be described as having a keypad, a microphone, and a window; but may just as well have only one of the named elements in accordance with the spirit of the invention. A keypad may be provided with a "QWERTY" style keyboard with control, function and option keys.

The functionality of the display/processor module 100 may include a microprocessor and memory for storage of data and instructions. The microprocessor may be a general purpose processor with a complex instruction set computer (CISC) architecture or a reduced instruction set computer (RISC) architecture. A CISC or RISC processor is preferable for handheld computers that are focused on text and numeric processing. Alternatively, the processor may include a digital signal processor (DSP) for audio processing and analog-to-digital (A/D) or digital-to-analog (D/A) conversion capability. A DSP may serve as the front end processor for a voice recognition capability and may be combined with a RISC or CISC processor. Other processing capabilities that may be included are formatting (or coding) and modulation for wireless transmission, as well the complementary processing required for wireless reception.

The types of input that may be processed by processor/display module 100 include audio, keypad entries, touch display screen entries, and electromagnetic signals. Some of these types of input may be accepted directly by the processor (e.g., electromagnetic signals or touch display screen entries), while others may be received from a slider (e.g., audio or keypad entries).

The processor/display module 100 may include a display area 106 such as a liquid crystal display (LCD), field emission display (FED), electronic paper, or other display with a thin form factor. For use as a video display for stored programs material or wireless reception, a fast display such as field emission display is preferred.

The display 106 may also be capable of accepting input as a touch panel display. Touch panel displays are typically multilayer structures combining a transparent means of sensing the position and possibly the magnitude of a contact local to the display surface with an underlying display. The overall display 106 may have a graffiti area 107 capable of accepting handwritten input. The display 106 may also have icons 108 that respond to touch.

Figure 2:
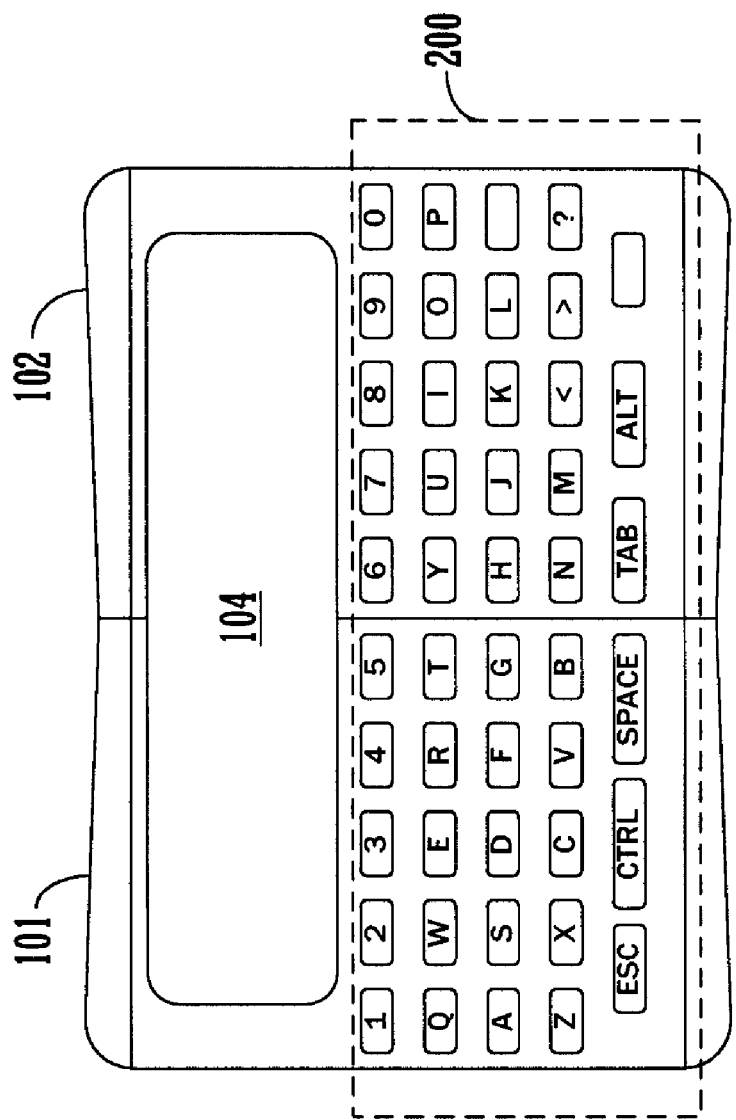
FIG. 2 shows the handheld data processing device with a sliding form factor in a closed position in accordance with an embodiment of the present claimed invention.

One function of sliders 101 and 102 is to protect the display/processor module 100, as shown by FIG. 2. In the closed position, the two sliders completely cover the upper surface of the processor/display module 100. Each slider may have a transparent window 104, preferably made from an impact and scratch resistant polymer. In the closed position shown in FIG. 2, the windows 104 provide partial visibility of the display while protecting the display.

The display driver of the device may be sensitive to the relative position of the sliders with respect to the display/processor module, and automatically adjust the area of the display used for output to match the visible area of the window region 104. For the configuration of FIG. 2, the area of the display used would be limited to the area visible through the windows 104. If a touch panel display is used with software generated icons, the icons may be automatically shifted in accordance with the slider position so that they remain accessible to the user.

FIG. 2 also shows a slightly modified QWERTY layout in which the standard key positions have been shifted in order to allow the layout to be separated into two halves, while occupying minimum space.

Referring again to FIG. 1, slider 101 and slider 102 each include a keypad and thus are examples of a keypad slider. A membrane keypad may be preferred. Drive current and signals generated by the keypad may be coupled to the display/processor 100 by a flexible ribbon connector or sliding contacts. Alternatively, signals between the sliders and display processor 100 may be optically coupled (e.g., a light emitting diode and detector pair).

Figure 3A:
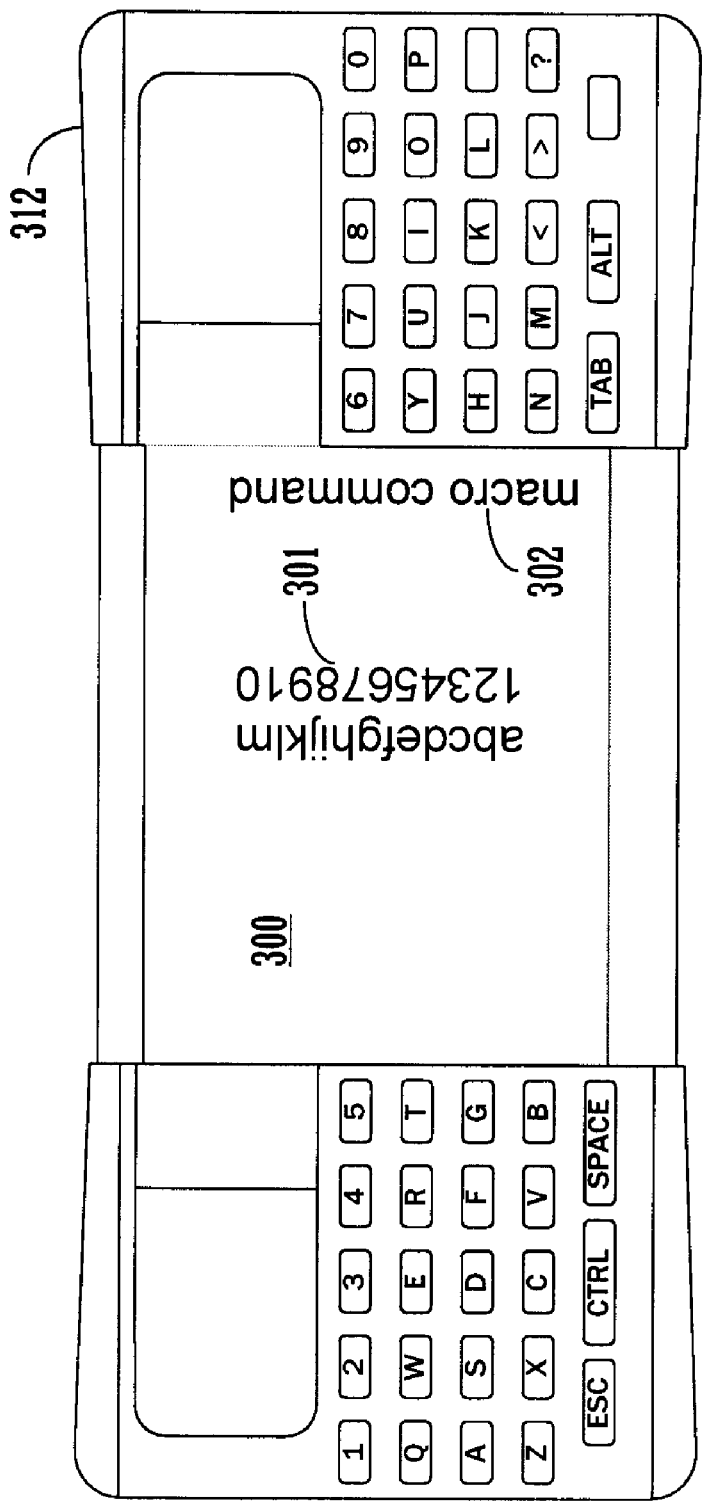
FIG. 3A shows a handheld data processing device with a sliding form factor in portrait display mode in accordance with an embodiment of the present claimed invention.
Figure 3B:
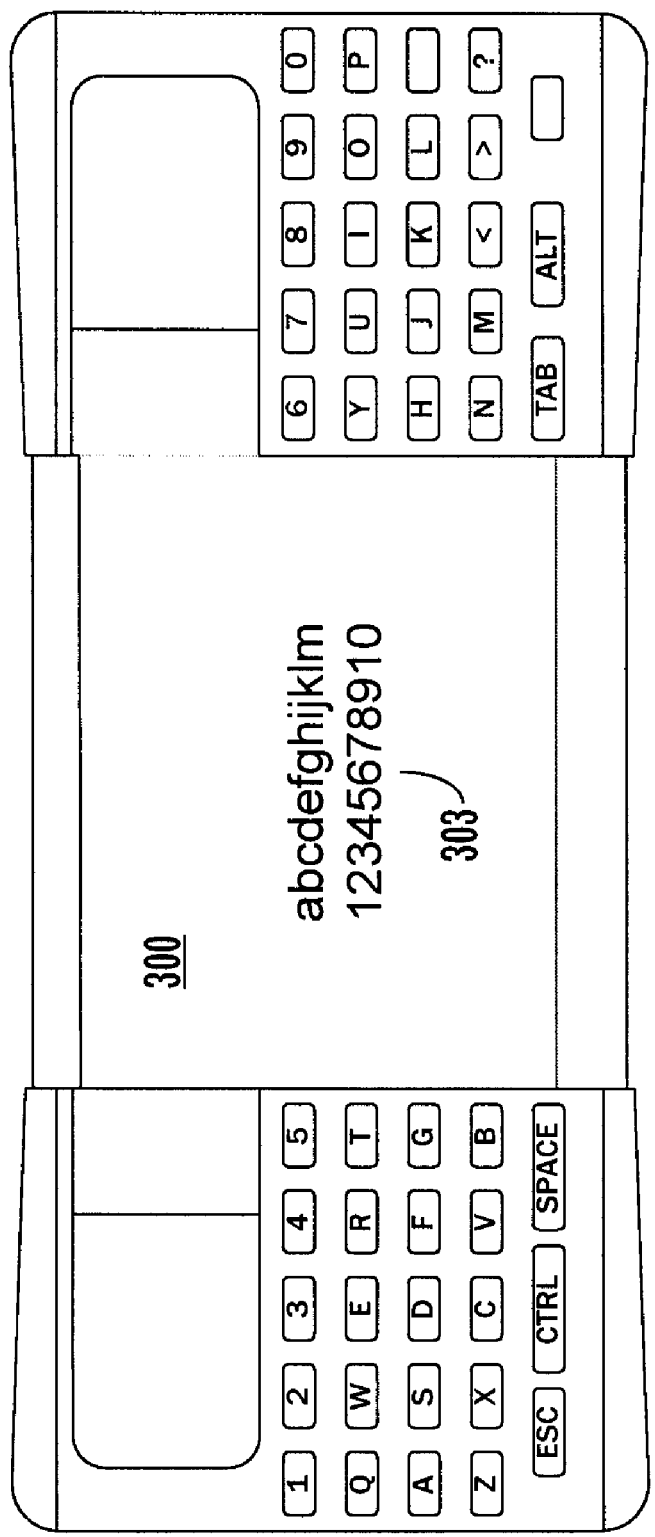
FIG. 3B shows a handheld data processing device with a sliding form factor in portrait display mode in accordance with an embodiment of the present claimed invention.

FIG. 3A shows a handheld data processing device with a display 300 that has a display orientation controller. The display orientation controller selects between two orthogonal display modes (e.g., portrait and landscape.) The portion of text 301 is displayed in portrait mode in FIG. 3A, whereas FIG. 3B shows a display 300 with a portion of text 303 that is displayed in landscape mode. It is appreciated that the display or portrait or landscape mode may be selected based on a user command, or, it may be automatically selected based on the orientation of the device.

The display 300 may also include a line selection driver for executing commands by using a slider to reference a line on the display. As shown in FIG. 3A, a "macro command" 302 is aligned with the edge of a slider 312 and is therefore selected. A macro command is a character string that refers to an executable command or series of commands. For example, the character string may be an email address or telephone number that may be selected for sending an email or initiating a telephone call. Once selected, the macro command may be executed by appropriate input (e.g., a keystroke or contact with a touch panel display).

Figure 4A:
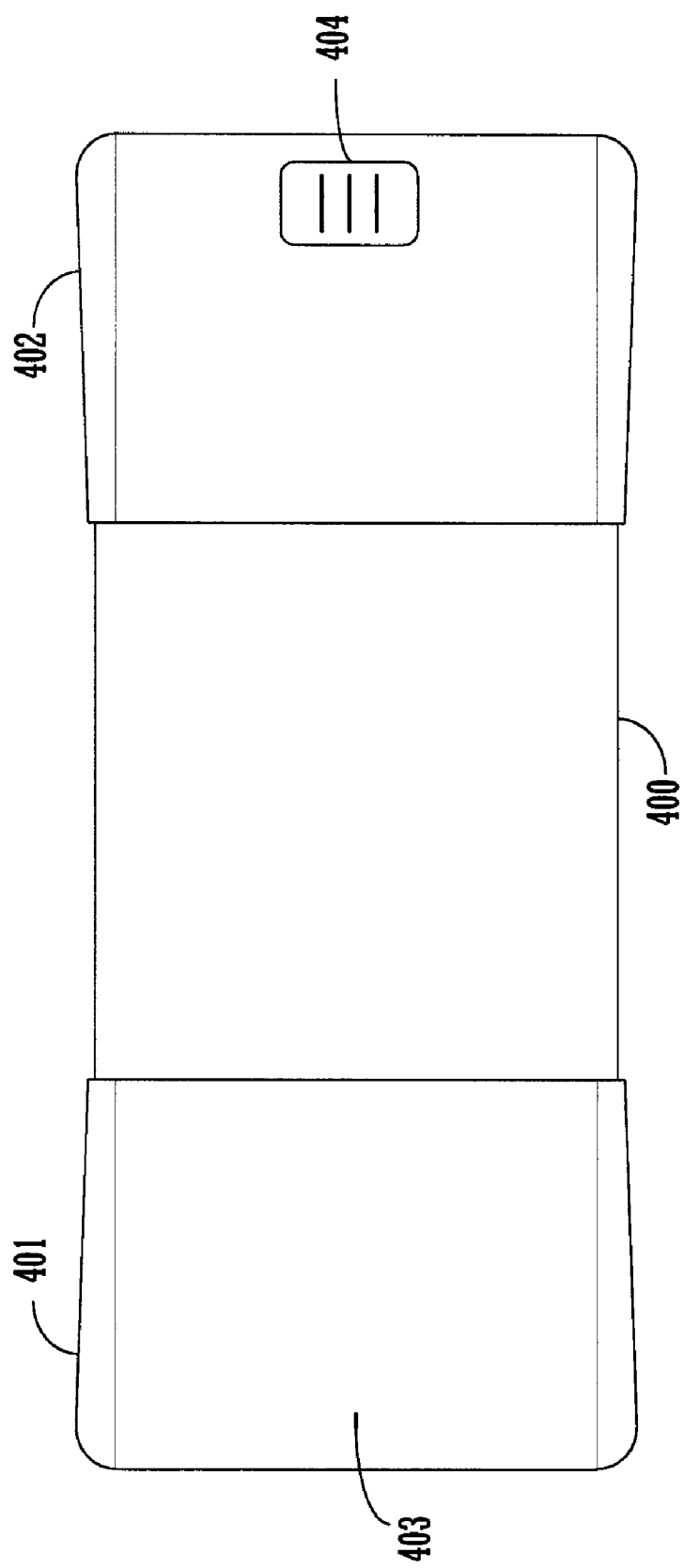
FIG. 4A shows a handheld wireless telephone with a sliding form factor in an open position in accordance with an embodiment of the present claimed invention.

FIG. 4A shows a rear view of the handheld wireless device, e.g., here a telephone, with a sliding form factor in an open position in accordance with an embodiment of the present claimed invention. The telephone has three basic components: a transceiver module 400, a first slider 401 and a second slider 402. The three components are similar to the three components shown in FIG. 1, and the wireless telephone may of FIG. 4A may be integrated with the data processing device of FIG. 1, with FIG. 4A providing a rear view of the integrated device to complement the front view provided by FIG. 1.

The first slider 401 includes a microphone 403 and is electrically and/or optically coupled to the transceiver module 400. The sliding interface between the slider 401 and the transceiver module 400 preferably incorporates a detent mechanism to enable repeatable and stable positioning of the slider 401 with respect to the transceiver module 400. In an integrated device, the microphone may also serve as an input device for voice recognition or recording.

The second slider 402 includes a speaker 404 and is electrically and/or optically coupled to the transceiver module 400. The sliding interface between the slider 401 and the transceiver module 400 preferably incorporates a detent mechanism to enable repeatable and stable positioning of the slider 402 with respect to the transceiver module 400. In an integrated device, the speaker may also serve as an output for stored audio program material or real-time broadcast audio material.

Figure 4B:
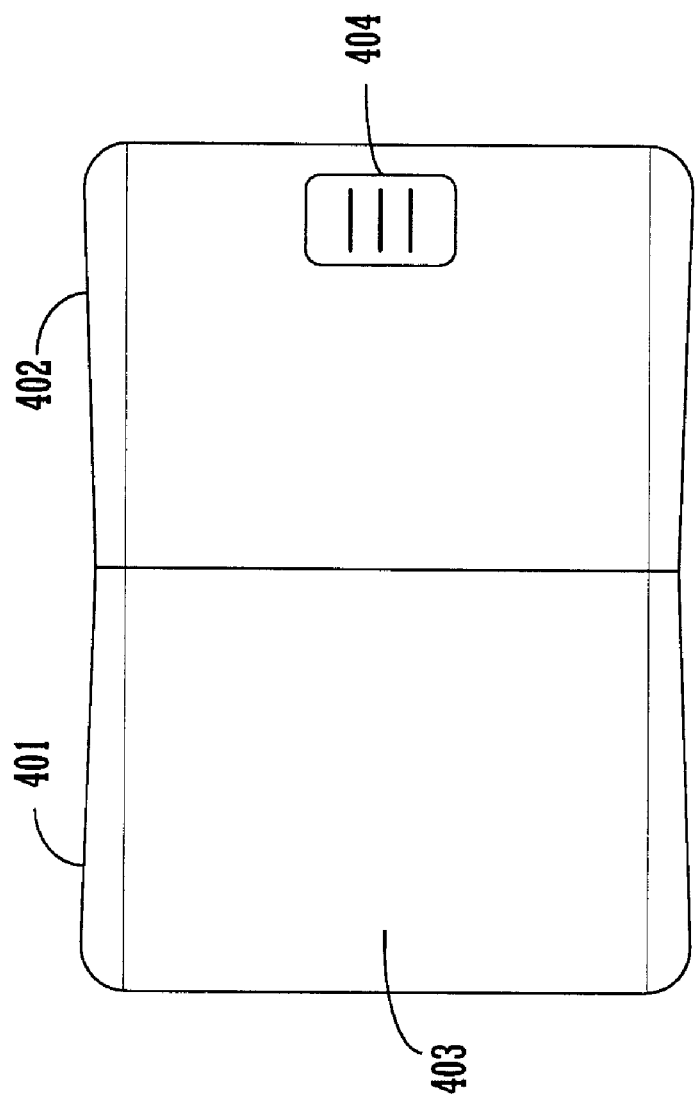
FIG. 4B shows a handheld wireless telephone with a sliding form factor in a closed position in accordance with an embodiment of the present claimed invention.

FIG. 4B shows a handheld wireless telephone with a sliding form factor in a closed position in accordance with an embodiment of the present claimed invention. For an integrated device, the view shown in FIG. 4B corresponds to the view shown in FIG. 2, wherein the front side of the integrated device is represented by FIG. 2 and the back side is represented by FIG. 4B.

In the integration of a wireless telephone and a data processing device with a display, there is a distinct advantage in allocating the telephony functions to the side opposite of the display side. Contact between a user's skin will tend to contaminate the a display surface, and contact between the user and the telephone is typically desirable in order to enhance the intelligibility of conversation and screen out ambient noise. In addition to the microphone 403 shown on slider 401, a second microphone may be included on the opposite side in an integrated device so that audio input such as speech could be input while looking at a display. In order to reduce noise, one microphone or the other may be automatically selected by the application that is currently being used (e.g., telephony or voice commands).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A handheld data processing device comprising:
a display/processor module;
a first keypad slider; and,
a second keypad slider;
wherein each of the first keypad slider and the second keypad slider are coupled to the display/processor module in order to (i) slide over the display/processor module, the device being in a closed position when the first keypad slider and second keypad slider are slid over the display/processor module, and (ii) slide away from the display/processor module, the device being in an open position when the first keypad slider and second keypad slider are slid away from the display/processor module; and
wherein each of the first keypad slider and the second keypad slider includes one or more input features for interfacing with the display/processor module both when the device is in the open position and when the device is in the closed position.

2. The handheld data processing device of claim 1, wherein said first keypad slider and said second keypad slider are configurable to fully cover a display surface of said display/processor module when the device is in the closed position.

3. The handheld data processing device of claim 1, wherein said first keypad slider includes a window.

4. The handheld data processing device of claim 3, wherein said second keypad slider comprises one or more windows.

5. The handheld data processing device of claim 1, further comprising a display orientation controller that orients the display based on a detected orientation of the device.

6. The handheld data processing device of claim 1, wherein at least said first keypad slider is electrically coupled to said display/processor module by a flexible ribbon connector.

7. The handheld data processing device of claim 1, wherein at least said first keypad slider is optically coupled to said display/processor module.

8. The handheld data processing device of claim 1, further comprising a detent mechanism for enabling repeatable and stable extension of the handheld data processing device.

9. The handheld data processing device of claim 1, wherein said first keypad slider or said second keypad slider includes a microphone.

10. The handheld data processing device of claim 9, further including a processor for processing voice communications received through the microphone.

11. The handheld data processing device of claim 1, wherein said first keypad slider or said second keypad slider includes a speaker.

12. The handheld data processing device of claim 1, wherein said device is a wireless communication device.

13. The handheld data processing device of claim 1, wherein said first keypad slider and said second keypad slider comprise a QWERTY style keypad.

14. A wireless communication device comprising:
a first slider having a first set of input features;
a display module; and,
a second slider having a second set of input features;
wherein each of the first slider and the second slider are coupled to the display module in order to (i) slide over the display module, the device being in a closed position when the first slider and second slider are slid over the display module, and (ii) slide away from the display module, the device being in an open position when the first slider and second slider are slid away from the display module;
wherein when in the open position, a display of the display module is fully exposed, and wherein when in the closed position, at least one of the input features on each of the first slider and the second slider is operable to interface with the display module.

* * * * *